United States Patent
Ma

(10) Patent No.: US 8,919,722 B2
(45) Date of Patent: Dec. 30, 2014

(54) MOVABLE BASE WITH WHEELS DEPLOYABLE BY REVERSIBLE DRIVING ASSEMBLY

(71) Applicant: Oliver Joen-an Ma, Arcadia, CA (US)

(72) Inventor: Oliver Joen-an Ma, Arcadia, CA (US)

(*) Notice: Subject to any disclaimer, the term of this patent is extended or adjusted under 35 U.S.C. 154(b) by 0 days.

(21) Appl. No.: 14/104,951

(22) Filed: Dec. 12, 2013

(65) Prior Publication Data
US 2014/0174254 A1 Jun. 26, 2014

Related U.S. Application Data

(62) Division of application No. 13/174,557, filed on Jun. 30, 2011, now Pat. No. 8,632,045.

(60) Provisional application No. 61/361,325, filed on Jul. 2, 2010.

(51) Int. Cl.
| | | |
|---|---|---|
| F16M 13/00 | (2006.01) | |
| F16H 21/54 | (2006.01) | |
| A45B 23/00 | (2006.01) | |
| A45B 25/00 | (2006.01) | |
| B62B 5/00 | (2006.01) | |
| B62B 3/10 | (2006.01) | |

(52) U.S. Cl.
CPC .............. *F16H 21/54* (2013.01); *A45B 23/00* (2013.01); *A45B 25/00* (2013.01); *B62B 5/0083* (2013.01); *A45B 2023/0012* (2013.01); *B62B 3/102* (2013.01); *B62B 2205/14* (2013.01)
USPC .............................. 248/519; 248/129; 135/16

(58) Field of Classification Search
USPC ......... 248/511, 519, 522, 129, 346.05, 354.3; 280/30; 135/16; 74/575, 577 R
See application file for complete search history.

(56) References Cited

U.S. PATENT DOCUMENTS

| 1,063,620 | A | 6/1913 | Thornley |
|---|---|---|---|
| 1,261,142 | A | 4/1918 | McNichol |

(Continued)

FOREIGN PATENT DOCUMENTS

| DE | 20015358 | 2/2001 |
|---|---|---|
| DE | 10311537 | 9/2004 |
| EP | 1243722 | 9/2002 |
| EP | 2389912 | 11/2011 |

OTHER PUBLICATIONS

Extended European Search Report, Application No. 11250635.7, mailed on May 8, 2013.

*Primary Examiner* — Bradley Duckworth
(74) *Attorney, Agent, or Firm* — Knobbe Martens Olson & Bear LLP

(57) ABSTRACT

A ratchet assembly includes an elongated shaft, a gear housing, a ratcheting member, and an arm. The elongated shaft can have a gear and be supported by the gear housing to allow rotation about a primary axis of the shaft. The ratcheting member can mount in the housing and be biased toward the gear to engage with the gear hindering relative rotation about the shaft axis in a first direction and allowing rotation about the shaft axis in a second direction opposite the first direction. The ratcheting member can rotatably mount within the housing about a second axis. The arm can couple to the gear housing in a first configuration to provide torque to rotate the housing about the shaft axis in the first direction when the arm is pressed downward. The arm can also be coupled to the gear housing in a second configuration to rotate the housing about the shaft axis in a second direction opposite the first direction when the arm is pressed downward.

19 Claims, 13 Drawing Sheets

(56) References Cited

U.S. PATENT DOCUMENTS

| | | |
|---|---|---|
| 1,427,296 A | 8/1922 | Wojciech |
| 1,940,523 A | 12/1933 | Barclay |
| 2,266,398 A | 12/1941 | Quayle |
| 2,379,476 A | 7/1945 | Cleveland, Jr. |
| 2,784,433 A | 3/1957 | Verhagen |
| 2,952,471 A | 9/1960 | Thorpe |
| 3,025,058 A | 3/1962 | Brumfield |
| 3,179,438 A | 4/1965 | Field |
| 3,259,432 A | 7/1966 | Jackson |
| 3,353,837 A | 11/1967 | Marcyan |
| 3,606,445 A | 9/1971 | Wunderlich |
| 3,633,242 A | 1/1972 | Wasofsky |
| 3,635,491 A | 1/1972 | Drews et al. |
| 3,841,631 A | 10/1974 | Dolan |
| 4,000,750 A | 1/1977 | Becher |
| 4,063,616 A | 12/1977 | Gutierrez |
| 4,177,978 A | 12/1979 | Warsaw |
| 4,249,282 A | 2/1981 | Little |
| 4,270,399 A | 6/1981 | Knief |
| 4,365,819 A | 12/1982 | Bart |
| 4,412,679 A | 11/1983 | Mahoney et al. |
| 4,417,738 A | 11/1983 | Kendall |
| 4,591,126 A | 5/1986 | Berney |
| 4,804,162 A | 2/1989 | Rice |
| 4,874,182 A | 10/1989 | Clark |
| 4,902,026 A | 2/1990 | Maldonado |
| 5,207,407 A | 5/1993 | Fitzsimmons et al. |
| 5,220,740 A | 6/1993 | Brault |
| 5,248,140 A | 9/1993 | Matherne et al. |
| 5,259,612 A | 11/1993 | Matherne et al. |
| 5,283,595 A | 2/1994 | Krukovsky |
| 5,322,023 A | 6/1994 | Hammond |
| 5,330,213 A | 7/1994 | Peruso |
| 5,348,326 A | 9/1994 | Fullenkamp et al. |
| 5,354,049 A | 10/1994 | Matherne et al. |
| 5,375,835 A | 12/1994 | Van Nimwegen et al. |
| 5,480,191 A | 1/1996 | Litin et al. |
| 5,599,037 A | 2/1997 | Spickler |
| 5,615,451 A | 4/1997 | Peterson et al. |
| 5,628,522 A | 5/1997 | Hall |
| 5,628,523 A | 5/1997 | Smith |
| 5,636,649 A | 6/1997 | Horvath |
| 5,730,668 A | 3/1998 | Hege et al. |
| 5,743,283 A | 4/1998 | Horvath |
| 5,839,714 A | 11/1998 | Fitzsimmons et al. |
| 5,940,932 A | 8/1999 | LaHay |
| 5,957,145 A | 9/1999 | Plumer |
| 5,979,793 A | 11/1999 | Louis |
| 6,113,054 A | 9/2000 | Ma |
| 6,305,659 B1 | 10/2001 | Metelski |
| 6,336,450 B1 | 1/2002 | Collet |
| 6,367,494 B1 | 4/2002 | Tung |
| 6,374,839 B2 | 4/2002 | Patarra |
| 6,405,990 B2 | 6/2002 | Davis et al. |
| 6,412,746 B2 | 7/2002 | Davis et al. |
| 6,412,747 B2 | 7/2002 | Davis et al. |
| 6,446,930 B1 | 9/2002 | Li |
| 6,478,799 B1 | 11/2002 | Williamson |
| 6,511,033 B2 | 1/2003 | Li |
| D470,305 S | 2/2003 | Clarke |
| 6,523,640 B1 | 2/2003 | Young et al. |
| 6,554,012 B2 | 4/2003 | Patarra |
| 6,554,243 B2 | 4/2003 | Davis et al. |
| 6,594,951 B1 | 7/2003 | Reynolds |
| 6,637,717 B2 | 10/2003 | Li |
| D484,303 S | 12/2003 | Taylor |
| 6,656,065 B2 | 12/2003 | Nye |
| D485,055 S | 1/2004 | Taylor |
| 6,682,055 B1 | 1/2004 | Tomlinson et al. |
| 6,732,752 B2 | 5/2004 | Cohen et al. |
| 6,758,715 B2 | 7/2004 | Banks |
| 6,796,319 B1 | 9/2004 | Patarra et al. |
| 6,827,321 B1 | 12/2004 | Murren et al. |
| 6,869,058 B2 | 3/2005 | Tung |
| 6,889,953 B2 | 5/2005 | Harbaugh |
| D516,297 S | 3/2006 | Smith et al. |
| 7,140,581 B1 | 11/2006 | White |
| 7,143,601 B1 | 12/2006 | Jimenez |
| 7,163,212 B1 | 1/2007 | Rupp |
| 7,207,570 B1 | 4/2007 | Forbes et al. |
| 7,347,428 B2 | 3/2008 | Edenso |
| D568,603 S | 5/2008 | Smith et al. |
| D573,786 S | 7/2008 | Smith et al. |
| D578,749 S | 10/2008 | Ng |
| 7,503,541 B2 | 3/2009 | Harold et al. |
| 7,513,479 B2 | 4/2009 | Li |
| 7,537,015 B1 | 5/2009 | Molnar, IV et al. |
| 7,584,563 B2 | 9/2009 | Hillstrom et al. |
| 7,614,600 B1 | 11/2009 | Smith et al. |
| 7,641,165 B2 | 1/2010 | Li |
| 7,836,902 B2 | 11/2010 | Tung |
| 7,891,633 B2 | 2/2011 | Li |
| 2001/0013358 A1 | 8/2001 | Patarra |
| 2001/0035485 A1 | 11/2001 | Davis et al. |
| 2001/0045498 A1 | 11/2001 | Davis et al. |
| 2002/0053631 A1 | 5/2002 | Li |
| 2002/0185582 A1 | 12/2002 | Li |
| 2003/0145498 A1 | 8/2003 | Venegas, Jr. |
| 2003/0230692 A1 | 12/2003 | Davis et al. |
| 2004/0056169 A1 | 3/2004 | Harbaugh |
| 2004/0069922 A1 | 4/2004 | Wu |
| 2004/0108439 A1 | 6/2004 | Ma |
| 2004/0195487 A1 | 10/2004 | Harbaugh |
| 2005/0161067 A1 | 7/2005 | Hollins |
| 2005/0189005 A1 | 9/2005 | Smith et al. |
| 2006/0054206 A1 | 3/2006 | Bilotti |
| 2006/0272686 A1 | 12/2006 | Tung |
| 2007/0080277 A1 | 4/2007 | Chen |
| 2008/0111046 A1 | 5/2008 | Tung |
| 2009/0056775 A1 | 3/2009 | Kuelbs |
| 2009/0174162 A1 | 7/2009 | Gass et al. |
| 2009/0320341 A1 | 12/2009 | Hillstrom et al. |
| 2010/0065709 A1 | 3/2010 | Ying |
| 2010/0147341 A1 | 6/2010 | Li |
| 2011/0232704 A1 | 9/2011 | Li |
| 2012/0024329 A1 | 2/2012 | Ma |
| 2012/0025050 A1 | 2/2012 | Ma |
| 2012/0285497 A1 | 11/2012 | Li |
| 2012/0285499 A1 | 11/2012 | Li |

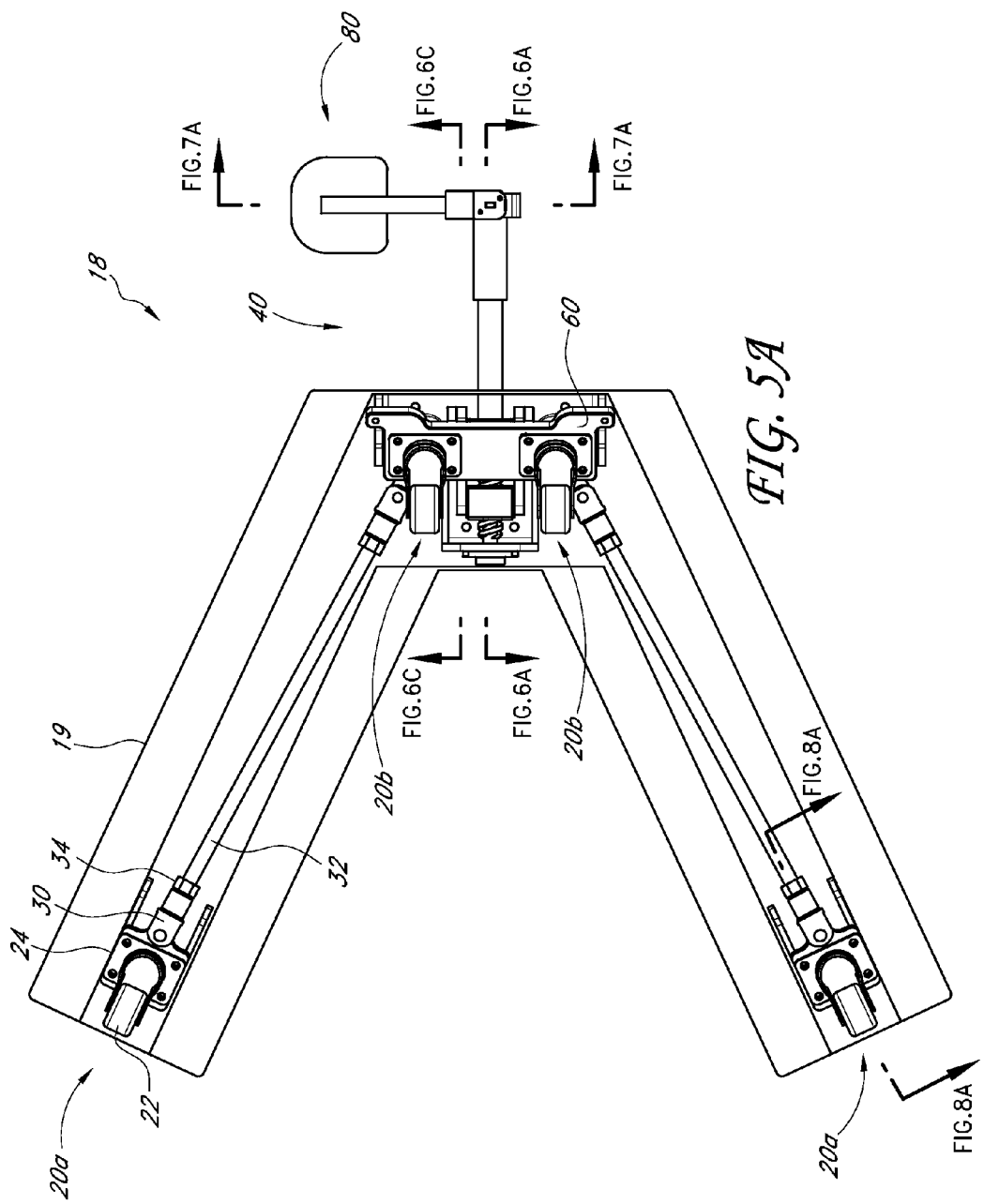

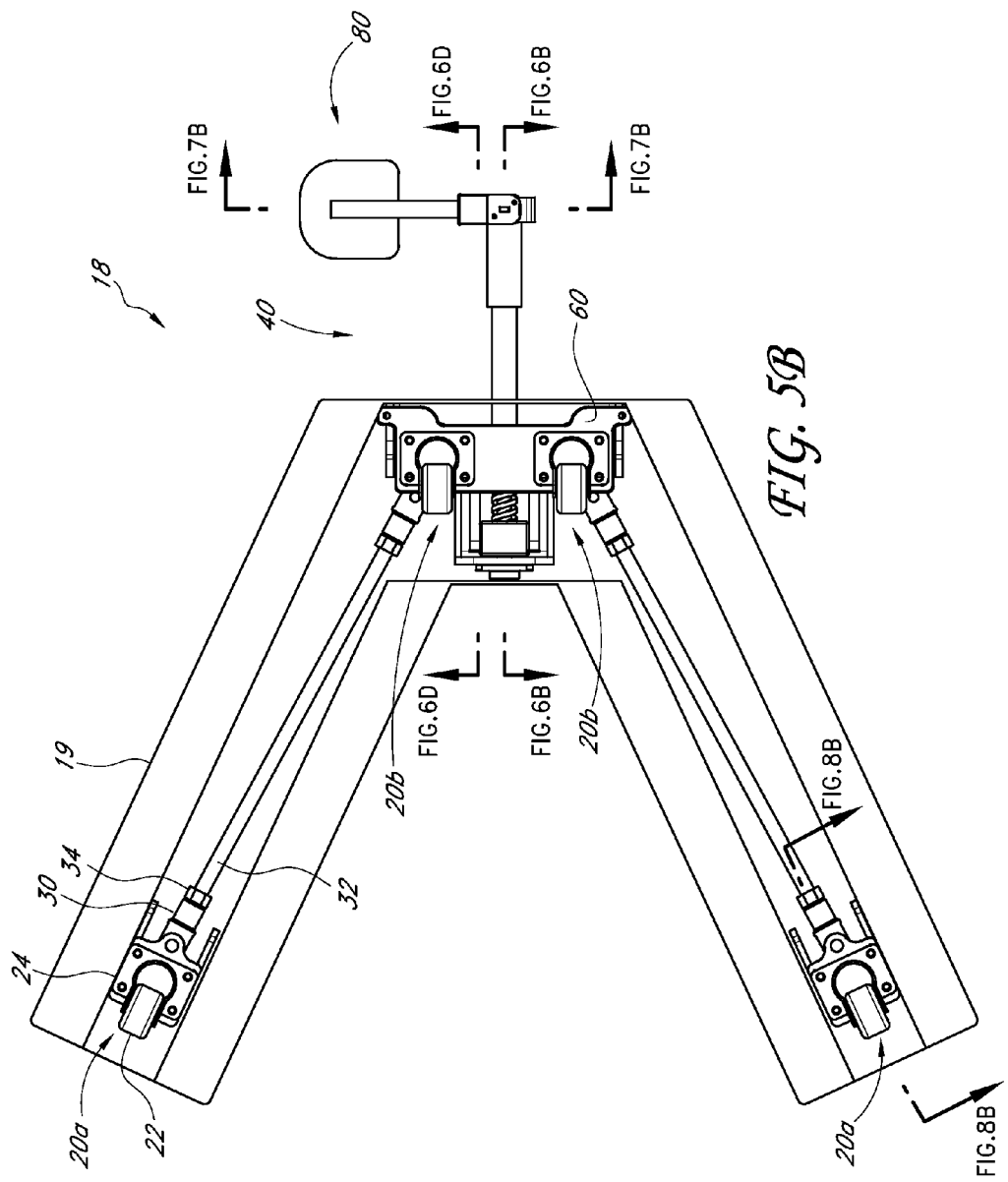

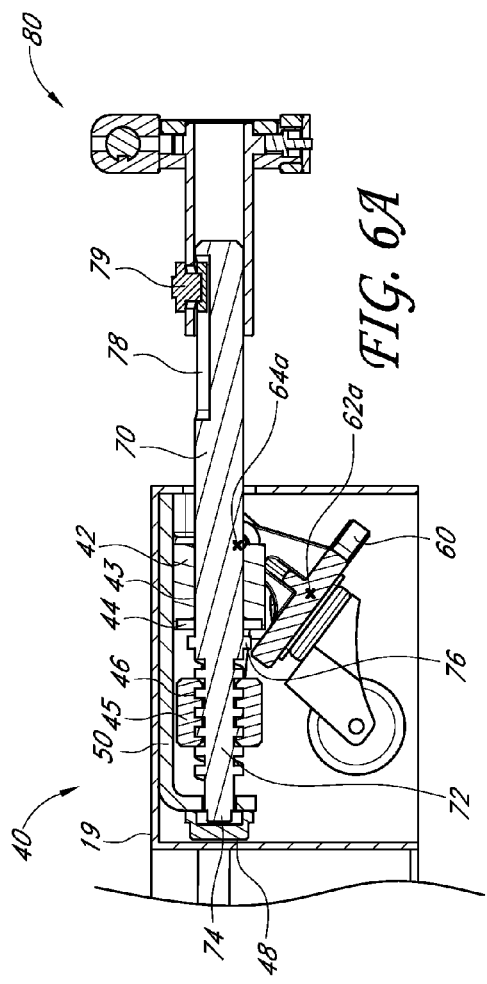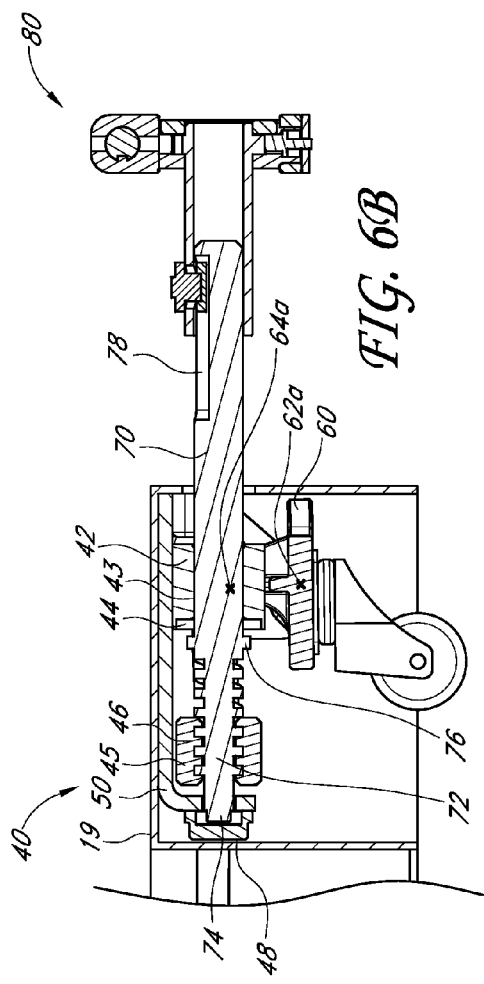

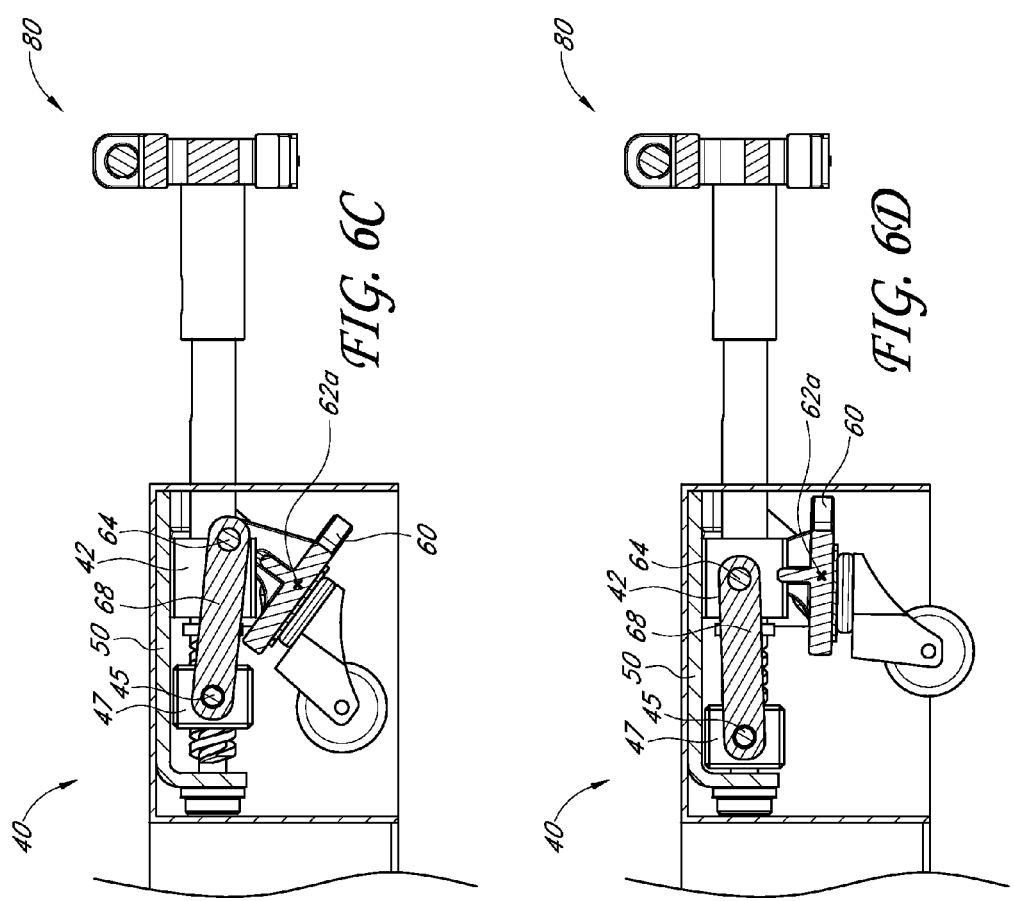

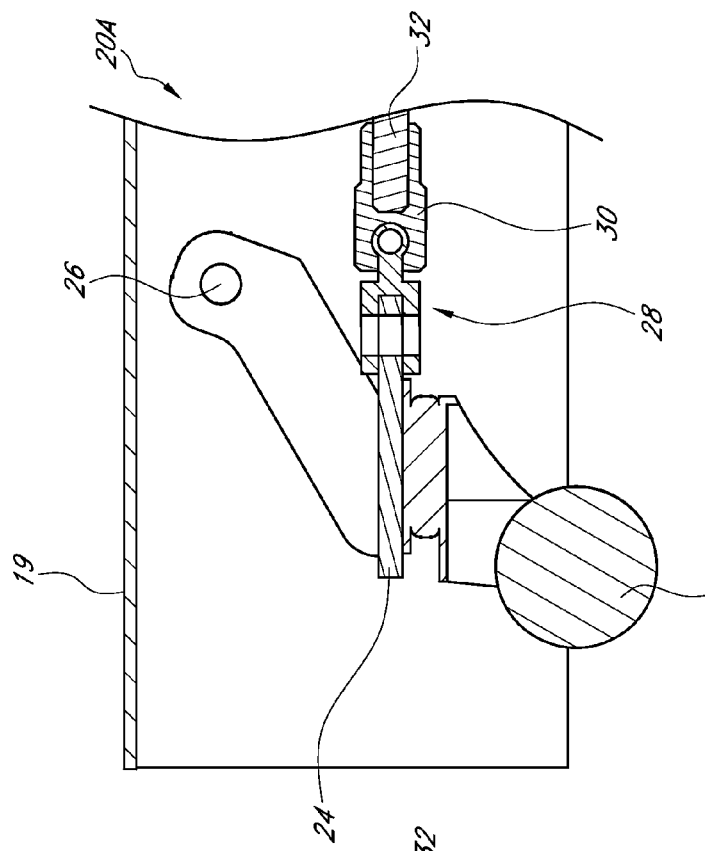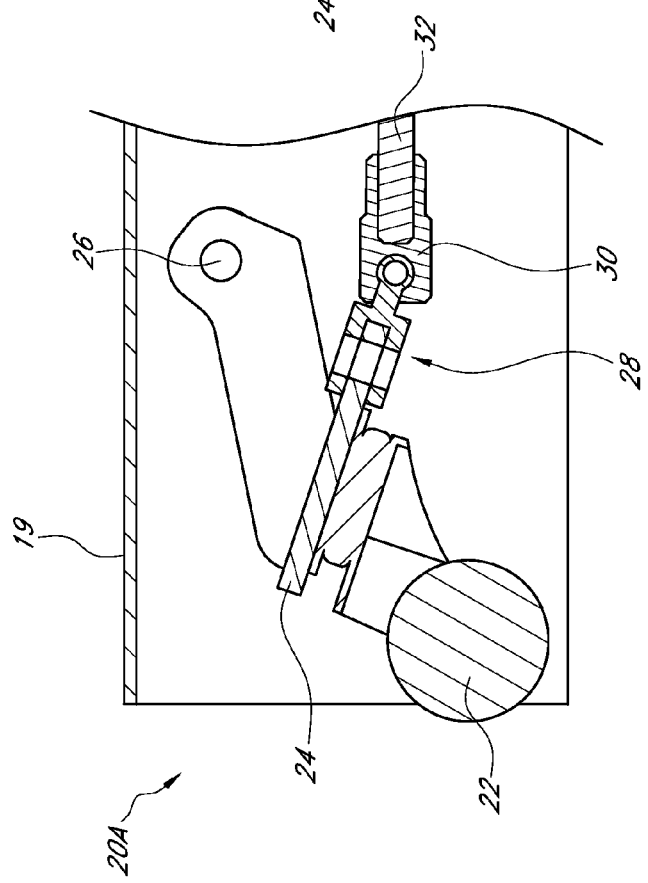
FIG. 8A
FIG. 8B

MOVABLE BASE WITH WHEELS DEPLOYABLE BY REVERSIBLE DRIVING ASSEMBLY

CROSS-REFERENCE TO RELATED APPLICATIONS

This application is a divisional application of U.S. patent application Ser. No. 13/174,557 (filed Jun. 30, 2011), entitled MOVABLE BASE WITH WHEELS DEPLOYABLE BY REVERSIBLE DRIVING ASSEMBLY, now issued as U.S. Pat. No. 8,632,045, which claims the priority benefit under 35 U.S.C. §119(e) to U.S. Provisional Patent Application No. 61/361,325 (filed Jul. 2, 2010), the entirety of which is hereby expressly incorporated by reference herein.

BACKGROUND OF THE INVENTIONS

1. Field of the Inventions

The inventions generally relate to load-supporting bases, and more particularly load-supporting bases with retractable wheels.

2. Description of the Related Art

In some cases heavy objects such as ladders and platforms are desired to be portable to enable their use in a variety of locations. For example, it is a common practice at retail stores to keep inventory in high shelves above the merchandise accessible to customers. The inventory is accessed using a portable ladder device that has wheels enabling the ladder to move about the store. A break device is sometimes provided with these ladders to immobilize the ladder when being used to access the inventory.

Other heavy objects are enabled to move or be immobilized by specialized mechanisms. For example, U.S. Pat. App. Pub. No. 2005/0189005 discloses a wheel lifted from the ground by a foot that is raised and lowered by turning a small screw in clockwise and counter-clockwise directions. Although this allows the apparatus to move on and off of the wheels, the mechanism provided may be inconvenient as the rotation of the screw may be difficult when the apparatus bears a heavy load.

SUMMARY OF THE INVENTIONS

One aspect of the inventions is to provide a movable base that is easy to move between configurations where the wheels are either deployed or retracted. For example, in one embodiment a base assembly includes a load-bearing base, an articulating element, at least one wheel, an elongated shaft, a rotation body, and a pedal. The articulating element can be rotatably coupled to the base at a first axis of rotation. The wheel can then be rotatably mounted to the articulating element at a second axis of rotation offset from the first axis of rotation. Thus, the wheel can translate upon rotation of the articulating element about the first axis of rotation. The elongated shaft can have a threaded portion in operative contact with the base and the articulating element such that the rotation of the elongated shaft. Rotation of the elongated shaft can then cause rotation of the articulating element with respect to the base. The elongated shaft can also include a first ratchet portion. The rotation body can be mounted on the elongated shaft and include a second ratchet portion. The ratchet portions can be in operative contact to allow relative rotation in a first direction about a primary axis of the elongated shaft and to prevent relative rotation in a second direction opposite the first direction. A pedal can mount to the rotation body, such that pressing downward on the pedal can rotate the rotation body in the second direction, causing a corresponding rotation of the elongated shaft. The rotation body can also be rotatable about a second axis of the elongated shaft. Upon rotation of the rotation body about the second axis the ratchet portions can allow relative rotation in the second direction about the primary axis and prevent relative rotation in the first direction, such that pressing downward on the pedal causes a rotation of the rotation body in the first direction, and a corresponding rotation of the elongated shaft.

In another embodiment, a base assembly can include a base, at least one wheel, an elongated shaft, a rotation body, and a pedal. The base can include a downward facing recess and a mounting portion to support an upward extending load. The wheel can be movably mounted to the base between a deployed first position extending from the recess and a retracted second position within the recess. The elongated shaft can have a threaded portion disposed within the base and in operative contact with the base and the at least one wheel. Rotation of the elongated shaft can then cause a movement of the wheel with respect to the base. The elongated shaft can also include a first ratchet portion. The rotation body can mount on the shaft and have a second ratchet portion in operative contact with the first ratchet portion. The ratchet portions can then hinder relative rotation about a primary axis of the elongated shaft. The pedal can mount to the rotation body such that pressing downward on the pedal can cause a rotation of the rotation body in a first direction about the primary axis of the elongated shaft. Further, this rotation can also cause a corresponding rotation of the elongated shaft. The rotation body can also be rotatable about a second axis not collinear with the first axis such that, upon rotation about the second axis, pressing downward on the pedal causes a rotation of the rotation body in a second direction about the primary axis of the elongated shaft opposite the first direction, and a corresponding rotation of the elongated shaft.

In a further embodiment, a ratchet assembly includes an elongated shaft, a gear housing, a ratcheting member, and an arm. The elongated shaft can have a gear and be supported by the gear housing to allow rotation about a primary axis of the shaft. The ratcheting member can mount in the housing and be biased toward the gear to engage with the gear hindering relative rotation about the shaft axis in a first direction and allowing rotation about the shaft axis in a second direction opposite the first direction. The ratcheting member can rotatably mount within the housing about a second axis. The arm can couple to the gear housing in a first configuration to provide torque to rotate the housing about the shaft axis in the first direction when the arm is pressed downward. The arm can also be coupled to the gear housing in a second configuration to rotate the housing about the shaft axis in a second direction opposite the first direction when the arm is pressed downward.

BRIEF DESCRIPTION OF THE DRAWINGS

Some preferred embodiments of the inventions will now be more particularly described by reference to the accompanying drawings in which:

FIG. 5A is a bottom view of the frame and control assembly of FIG. 4;

FIG. 5B is a bottom view of the frame of and control assembly FIG. 4 wherein wheels are deployed;

FIG. 6A is a side cross-sectional view at 6A-6A of the control assembly as arranged in FIG. 5A;

FIG. 6B is a side cross-sectional view at 6B-6B of the control assembly as arranged in FIG. 5B;

FIG. 6C is a side cross-sectional view at 6C-6C of the control assembly as arranged in FIG. 5A;

FIG. 6D is a side cross-sectional view at 6D-6D of the control assembly as arranged in FIG. 5B;

FIG. 8A is a side cross-sectional view at 8A-8A of wheels as arranged in FIG. 5A;

FIG. 8B is a side cross-sectional view at 8B-8B of wheels as arranged in FIG. 5B;

DETAILED DESCRIPTION OF THE PREFERRED EMBODIMENTS

Figure 1A:
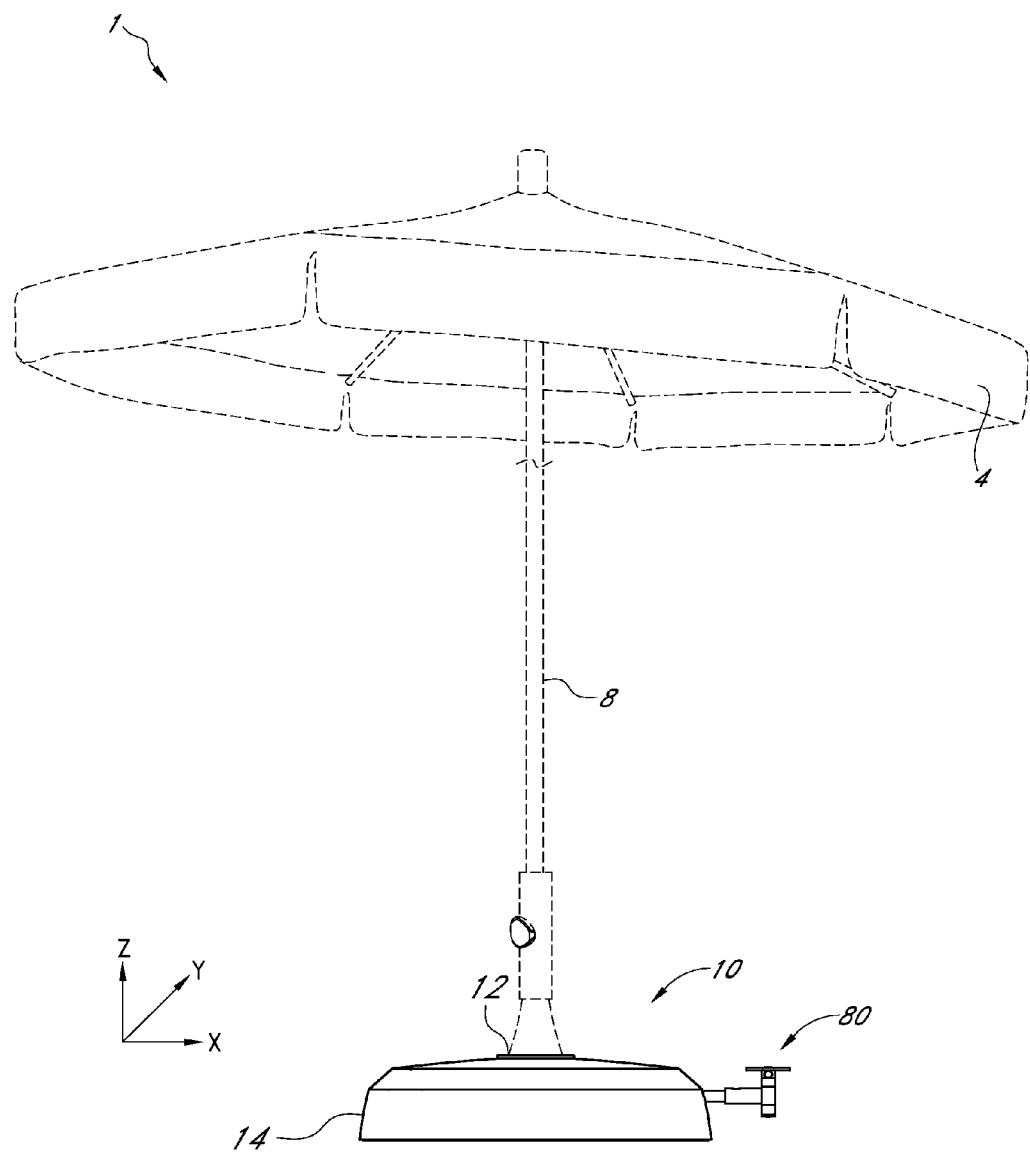
FIG. 1A is a side view of one embodiment of a movable base supporting an umbrella wherein wheels are retracted.
Figure 1B:
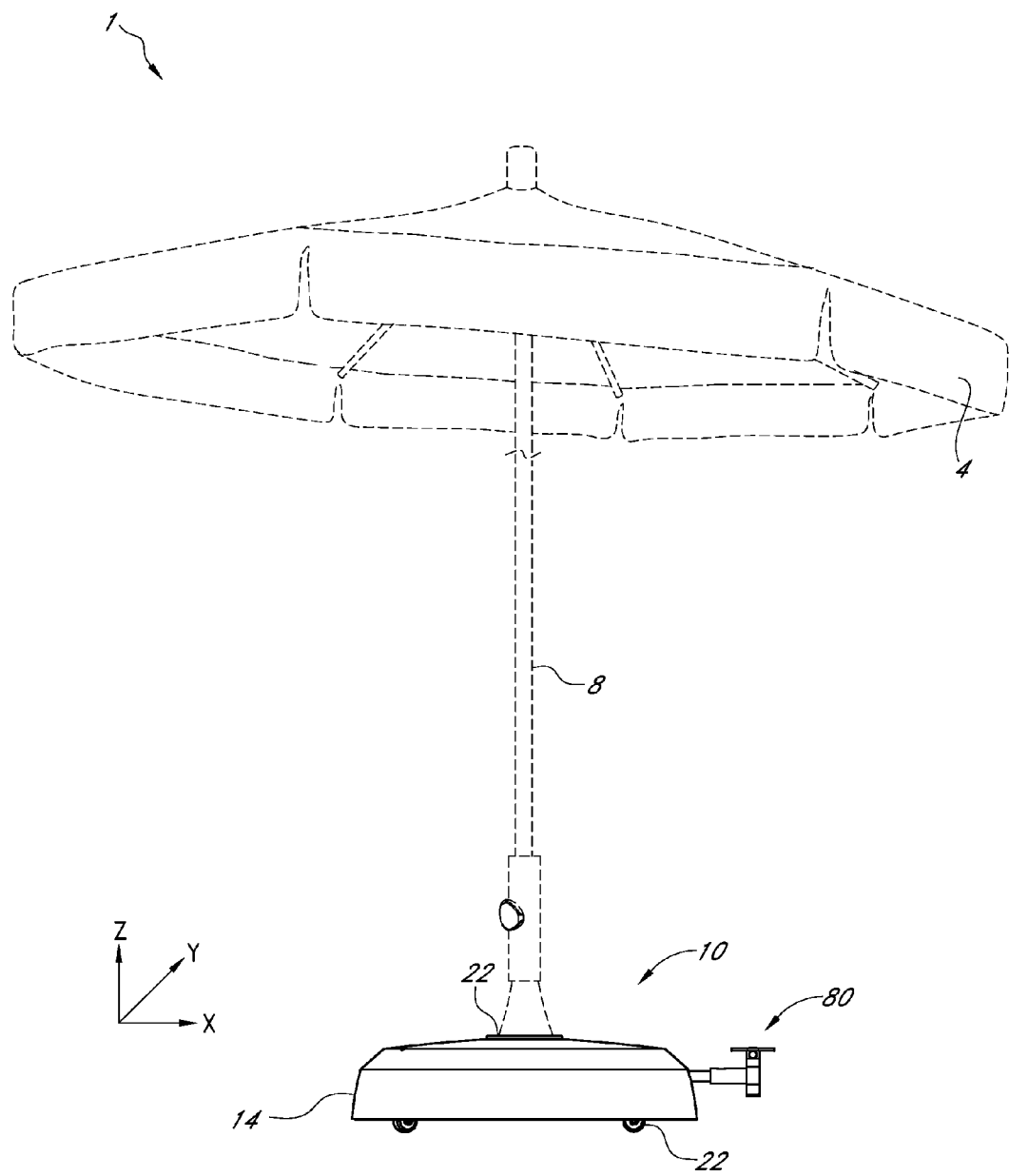
FIG. 1B is a side view of the movable base of FIG. 1A wherein wheels are deployed.
Figure 4:
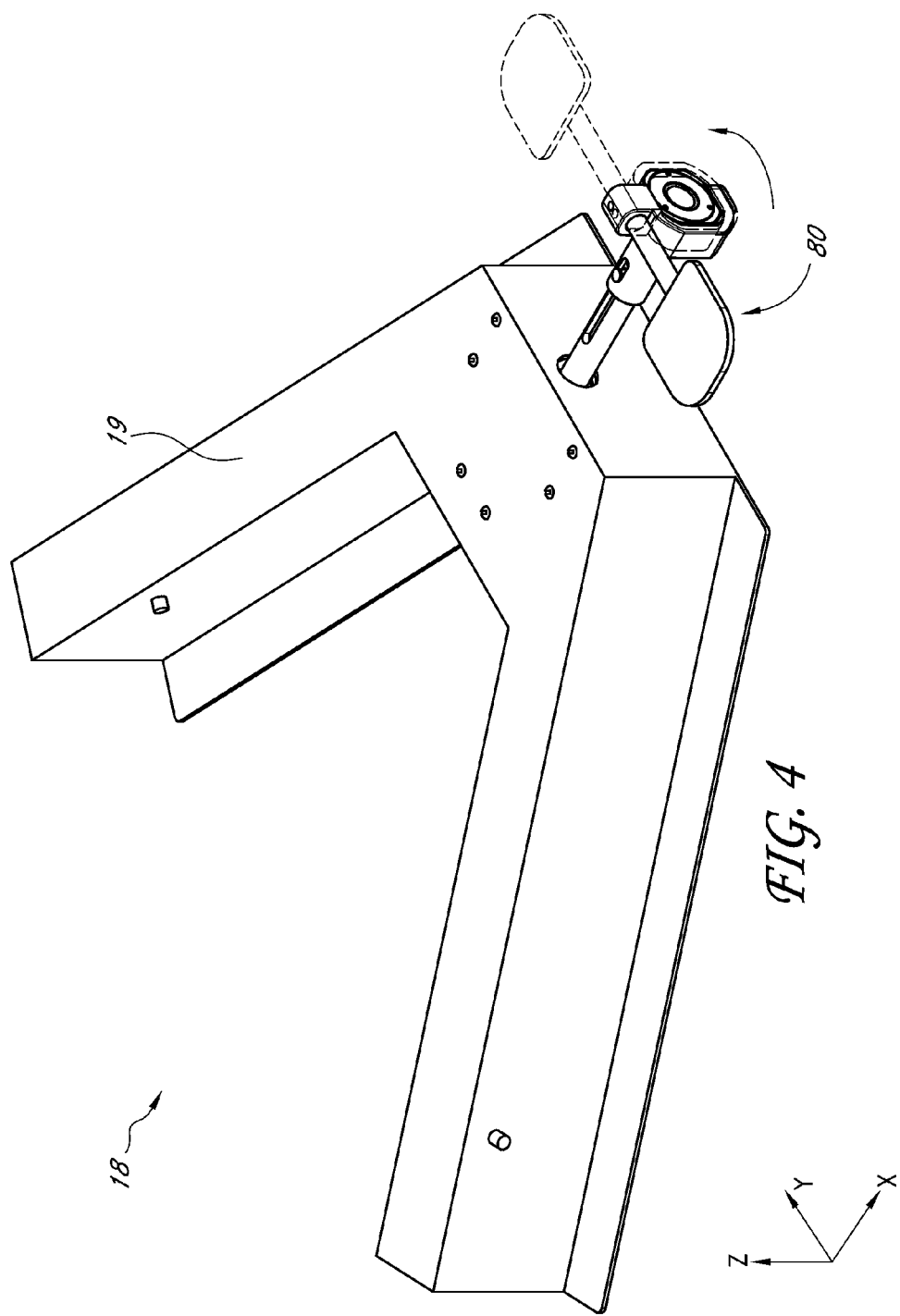
FIG. 4 is an enlarged perspective view of a frame and control assembly of the base of FIG. 3, indicating a motion from this position to a second position, the second position indicated in phantom.
Figure 7B:
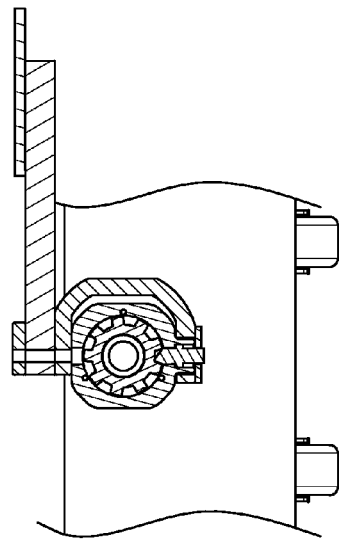
FIG. 7B is a side cross-sectional view at 7B-7B of the actuation assembly as arranged in FIG. 5B.
Figure 7D:
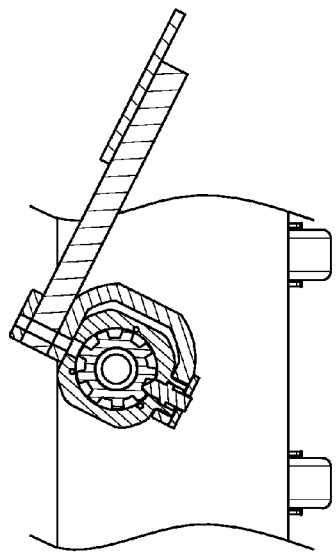
FIG. 7D is a side cross-sectional view of the actuation assembly of FIG. 7B in a rotated position.
Figure 7A:
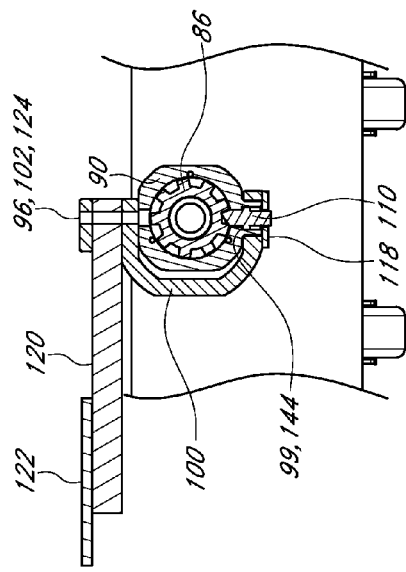
FIG. 7A is a side cross-sectional view at 7A-7A of the actuation assembly as arranged in FIG. 5A.
Figure 7C:
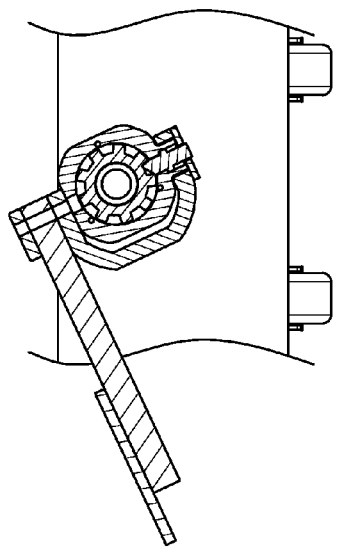
FIG. 7C is a side cross-sectional view of the actuation assembly of FIG. 7A in a rotated position.

FIGS. 1A, 1B, and 4 depict an x-y-z Cartesian coordinate system, with the base assembly 10 primarily lying in the x-y plane. To assist in the description of these components, the following terms are used. As described herein, terms such as "height" refer to distance in the z-direction, and "higher/upward" and "lower/downward" refer to the positive and negative z-direction, respectively. Similarly, terms such as "lateral" will refer to the y-direction and "longitudinal" will refer to the x-direction. Further, rotation about a "lateral," "longitudinal," or "vertical" axis will be understood to mean that the axis of rotation is in said direction. However, in other embodiments these axes could be rotated, reversed, or otherwise altered. Terms such as "clockwise" and "counter-clockwise" should be interpreted relative to the perspective of the figures, and it will be understood that these directions may be reversed when other perspectives are used. A detailed description of preferred embodiments of movable base assemblies and their associated methods of use now follows.

FIG. 1A illustrates one embodiment, in which an umbrella system 1 can include an umbrella mounted on a movable base assembly 10. As depicted, the umbrella includes an umbrella canopy 4 and a single umbrella pole 8. However, in other embodiments the umbrella system 1 can have different forms, such as including a cantilevered umbrella. Further, in other embodiments another item to be supported by the base assembly 10 can be substituted for the umbrella, such as a space heater, street lamp, general purpose cart, semi-mobile furniture such as a desk or chair, or the like. The umbrella pole 8, or other items, can mount to a mounting portion 12 on the base assembly 10 to support the rest of the umbrella assembly 1.

As further depicted in FIG. 1B, the base assembly 10 can include a plurality of wheels 22. Thus, the base assembly 10, and the umbrella (or another load) can be easily rolled to different locations on the wheels 22, when deployed. Comparing FIGS. 1A and 1B shows that the wheels 22 can also be retracted.

FIGS. 1A and 1B also depict an actuating shaft 120, depicted as a lever or foot pedal. As will be discussed further below, the wheels 22 of the umbrella system 1 can be retracted upon actuation of the foot pedal 120. The wheels 22 can be retracted into a cover 14, and the cover can then substantially bear the weight of the umbrella or other load. When the wheels 22 are retracted, the bottom surface of the cover 14 can produce sufficient friction with the ground to substantially hinder sliding or other lateral movement of the umbrella system 1. Thus, in some embodiments the umbrella assembly 1 can stay in a desired position when the wheels are retracted.

It will be noted that, in some embodiments, the wheels 22 can continue to contact the ground on which the base assembly 10 (and the cover 14) rest even when the wheels 22 are in a retracted position. Nevertheless, the wheels 22 can bare a relatively small portion of the weight of the umbrella system 1 in comparison to the weight supported by the cover 14. Thus, even though the wheels 22 can contact the ground, engagement of the cover 14 with the ground can still substantially prevent sliding or rolling of the umbrella system 1. However, in other embodiments the wheels 22 can be configured to not touch the ground when in a retracted position.

Figure 2A:
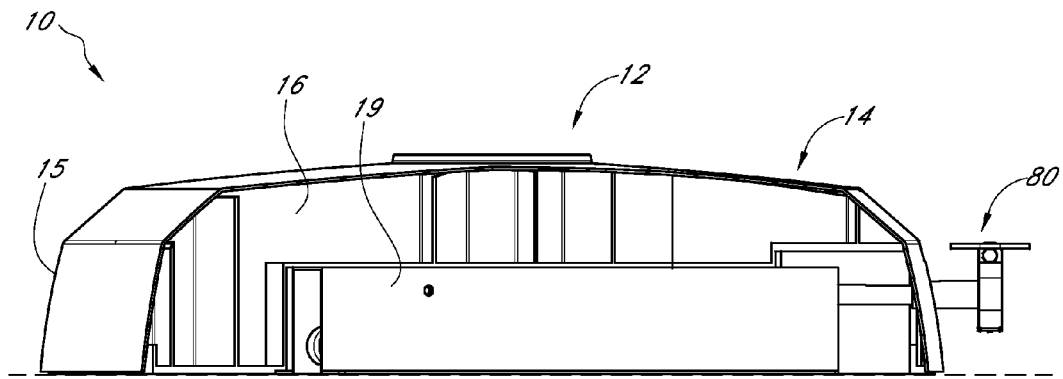
FIG. 2A is a cut-away view of the base of FIG. 1A.
Figure 2B:
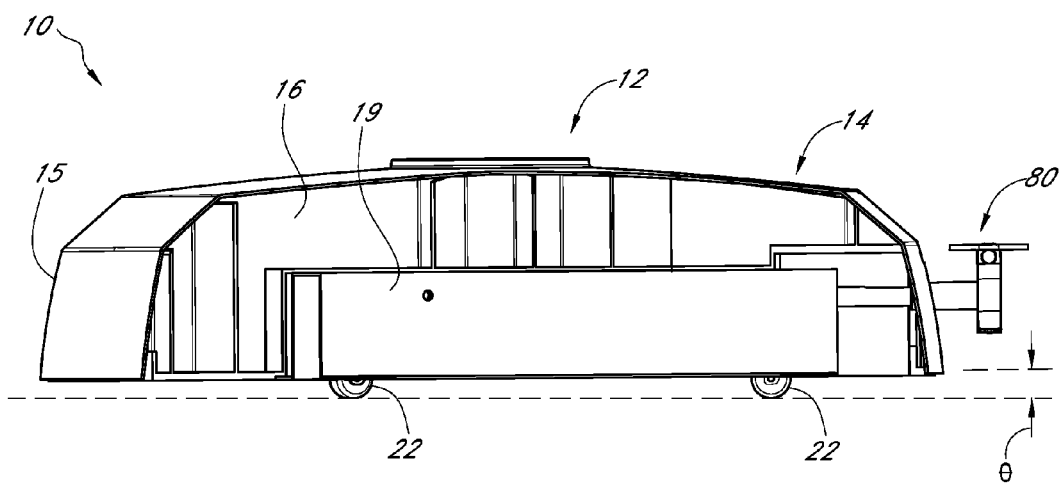
FIG. 2B is a cut-away view of the base of FIG. 1B.
Figure 3:
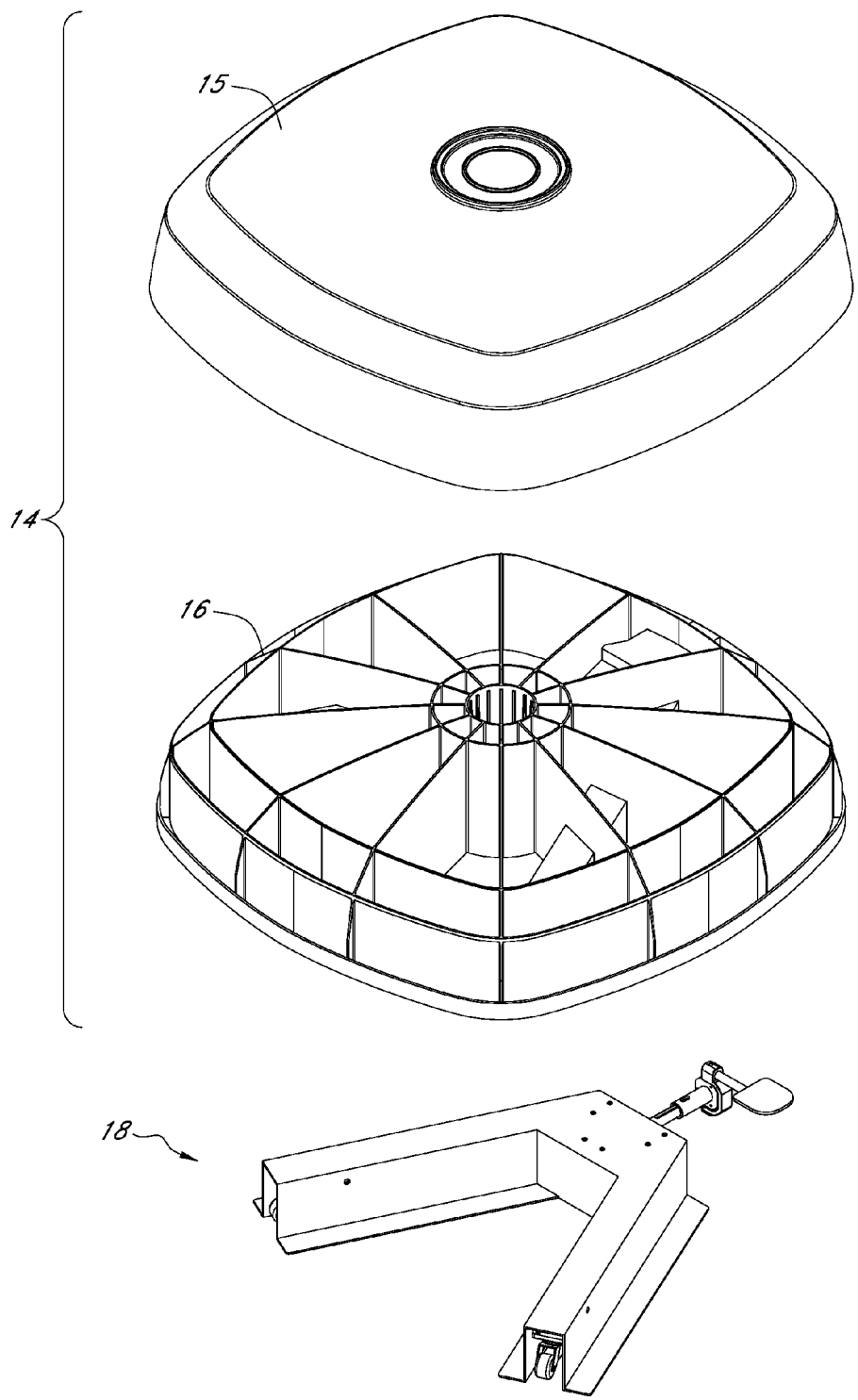
FIG. 3 is an exploded view of the base of FIG. 1A.

FIGS. 2A, 2B, and 3 depict the base assembly 10 and some of its various components. The cover 14, when present, can rest on the remainder of the base assembly 10. For example, in some embodiments the cover 14 can have a 2-part structure, including a cap 15 and a support element 16 that rests on a frame 18, as depicted in FIGS. 2A, 2B, and 3. Thus, the cover 14 can be removable from the frame 18. The cap 15 and the support element 16 can optionally also be independently removable from each other and/or the frame 18. In further embodiments, the cover 14 can be only an aesthetic cap 15, providing no structural function and only covering the frame 18 from view and the elements. In such embodiments a mounting portion 12 can be provided, e.g., on the frame 18. Alternatively, in some embodiments the cover 14 can have no cap 15 or other aesthetic covers. In some embodiments the cover 14 can only consist of a support element 16. In other embodiments, the cover 14 includes a support element 16 configured to be exposed in use. The support element 16 can be a generally skeletal piece between the frame 18 and the cover 14 that provides the cover 14 with structural support. Thus, the deployed wheels 22 can support the frame 18, the frame 18 can support the support element 16, the support element 16 can support the cap 15 and any other portions of the cover 14, and the cover 14 can support a load such as an umbrella. In other embodiments, the cover 14 can include an integral (e.g., a single piece) cap 15 and support element 16.

When the cover 14 is present, as depicted in FIGS. 1A, 2A, the wheels 22 can be withdrawn or retracted into one or more downward facing recesses 17 defined by the cover. The recesses 17 can be shaped to receive the wheels 22, as well as structures associated with the wheels such as the frame 18. Thus, for example, the recesses 17 can have a "V" shape similar to that of the frame 18, as discussed below. The recesses 17 can also substantially define the location of the frame 18 relative to the cover 14, and accordingly to the mounting portion 12 (when on the cover). The recesses 17 can be positioned at a generally central location within the cover 14. Advantageously, this can center the wheels 22 about the mounting portion 12. However, in other embodiments the recesses 17 can be positioned otherwise.

When the wheels 22 are retracted the cover 14 can then, as discussed above, be in direct contact with and be supported by the ground. The wheels 22 can be suspended above the ground by the cover 14, or alternatively bear a relatively small portion of the weight of the umbrella system 1.

The cover 14 is depicted as completely covering the frame 18 and other parts of the base assembly 10, but the cover can also take other forms. In other embodiments, the cover 14 can substantially cover the base but leave certain windows open. Thus, downward facing recesses 17 on the cover 14 that receive the retracted wheels 22 need not be fully enclosed in all embodiments.

As depicted in FIG. 3, the base assembly 10 can include a frame 18. The frame 18 can include one or more wheel assemblies 20 and is depicted as having four in FIGS. 5A, 5B. As depicted, the wheel assemblies are arranged in a "V" orientation (although other orientations and numbers of wheels are possible). The frame 18 can have also have a "V" shape, or another shape that can correspond with the arrangement of the wheel assemblies 20. Two wheel assemblies 20a can be at ends of the V, and two wheel assemblies 20b can be at the angled portion of the V. Each wheel assembly 20a at the ends of the frame 18 can include a wheel 22 mounted to a wheel mount 24. The wheel mounts 24 can include a housing pivot 26. At the housing pivot 26, the wheel mount 24 can rotatably mount to a housing 19 of the frame 18. Similarly, the wheel assemblies 20b at the angled portion of the housing 19 can be rotatably mounted to other features (as further described below). This housing 19 can have a generally hollow downward facing portion that receives the wheel assemblies 20, as well as other features described below.

Accordingly, the wheel assemblies 20 can be moved between two positions. One position can be a deployed position. The deployed position can be oriented more perpendicularly downward and away from the housing 19 to support the umbrella system 1. The other position can be a retracted position. The retracted position can be oriented more toward an orientation parallel with the housing and allow the cover 14 to support the umbrella system. In the more perpendicular orientation the wheel assemblies 20 can extend out of the cover 14, and in the more parallel orientation the wheel assemblies 20 can be generally retracted into the cover 14. However, in other embodiments the particular orientations may vary. For example, in some embodiments the retracted position can orient the wheel assemblies 20 perpendicularly upward and away from the ground. Notably, in the depicted embodiment the housing 19 has sufficient height and length to also support the retracted wheels. However, in other embodiments the housing 19 can be shorter, such that the cover 14 would lift the housing 19 in order to lift the wheel assemblies 20.

The wheel assemblies 20a at the ends of the frame 18 can additionally include a control pivot 28 on the wheel mounts 24, as best depicted in FIGS. 8A, 8B. Through the control pivots 28, the wheel assemblies 20a can mount to couplers 30. The couplers 30 can rotatably mount to transmission members 32. Thus, the couplers 30 can provide two axes of rotation between the wheel assemblies 20a and the transmission members 32, and provide a universal joint. The couplers 30 can attach to the wheel assembly 20a by a pin joint at the control pivot 28, forming one of the axes of rotation. The other axis of rotation can be integral to the couplers 30. Finally, the couplers 30 can connect to an end of the transmission members 32 by a screw fit. The screw fit can be formed by a male threaded portion on the transmission member 32 and a female threaded portion on the coupler 30, although other combinations are possible.

The transmission members 32 can be in the form of extended rods and can attach by a similar screw fit to similar couplers 30 at an opposite end of the transmission members 32. These couplers 30 can similarly provide two axes of rotation between the transmission member 32 and a wheel receiving body 60 at the angled portion of the frame 18 or "V" shape. The wheel receiving body 60 can receive the couplers 30 at a second rotational connection 64, further discussed below. Two wheel assemblies 20b can attach to the wheel receiving body 60 and rotate therewith, thus providing wheel support to the frame 18 at its angled portion or "V" shape. Thus, the two wheel assemblies 20a at the ends of the V can connect by the transmission members 32 to the two wheel assemblies 20b at a center of the V. The wheel assemblies 20a at the ends can connect to the housing 19 at housing pivots 26, such that they can rotate between retracted and deployed positions. The wheel assemblies 20b at the angled portion of the frame 18 can rotate with the wheel receiving body 60, which rotates as further described below. Further, via the connection through the transmission members 32, in the depicted embodiment all the wheel assemblies 20 can move in unison between the retracted and deployed positions. More specifically, in some embodiments the wheel assemblies 20 and the transmission members 32 can be configured such that aspects of the rotational motion of each wheel can be approximately equal (e.g., each moving through similar angles of rotation).

However, in some embodiments, the rotational motion of the wheels 22 can slightly differ due to the geometry of the couplers 30, transmission members 32, wheel receiving body 60, and the housing 19 to which they are connected. For example, as depicted in FIG. 2B, the wheels 22 may extend differing lengths or distances from the cover 14, putting the cover 14 at an angle θ relative to the ground. In such embodiments, the base assembly 10 can be configured to ensure that each wheel 22 extends beyond the cover 14 in the deployed position, and does not extend beyond the cover in the retracted position. For example, in some embodiments the clearance between the bottom of the wheels 22 and the cover 14 in the deployed position can be sufficient to ensure that all wheels extend past the cover. Further, in some embodiments the bottom surface of the cover 14 can be at an angle relative to the wheels 22, such that they can extend an approximately equal amount therefrom. For example, the cover 14 (and/or the base assembly 10) can be configured such that the mounting portion 12 is generally oriented perpendicular to the ground when the wheels 22 are in a retracted position. Thus, e.g., an umbrella pole 8 mounted in the mounting portion 12 can also stand perpendicular to the ground when the wheels 22 are in a retracted position.

In the depicted embodiment, each of the wheel assemblies 20 can be directly or indirectly moved by a control assembly 40. The control assembly 40 can be disposed at the point, center, or angled portion of the V shape of the housing 19, but can be positioned elsewhere in other embodiments. As will be described further below, the middle wheel assemblies 20b can be directly connected to the control assembly 40. Thus, in a sense, the motion of the middle wheel assemblies 20b can substantially control the motion of the other wheel assemblies 20a. In some embodiments, the wheel assemblies 20a, 20b can move in unison under the control assembly 40.

Figure 9:
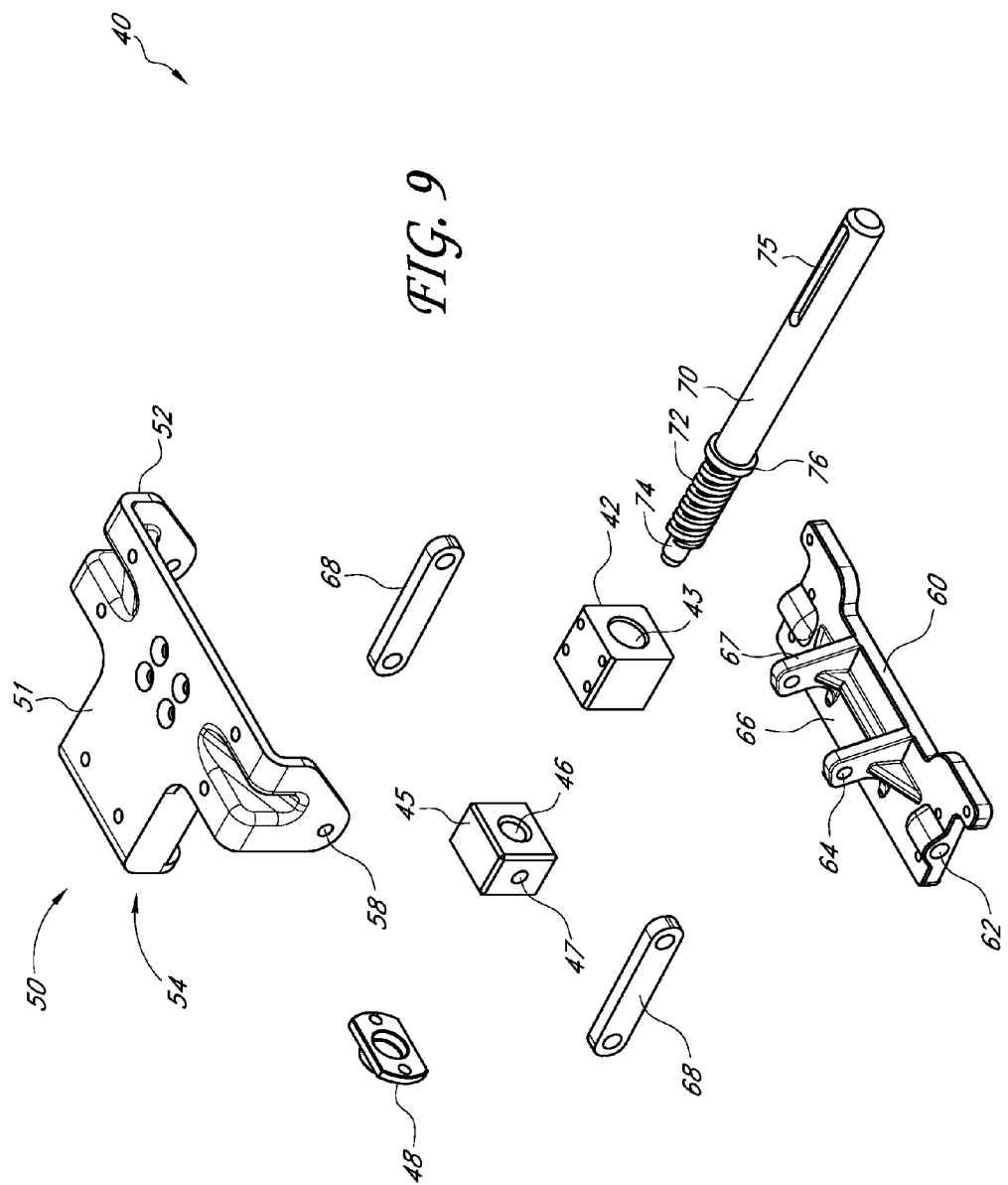
FIG. 9 is an exploded view of a portion of the control assembly illustrated in FIGS. 5A, 5B.
Figure 10:
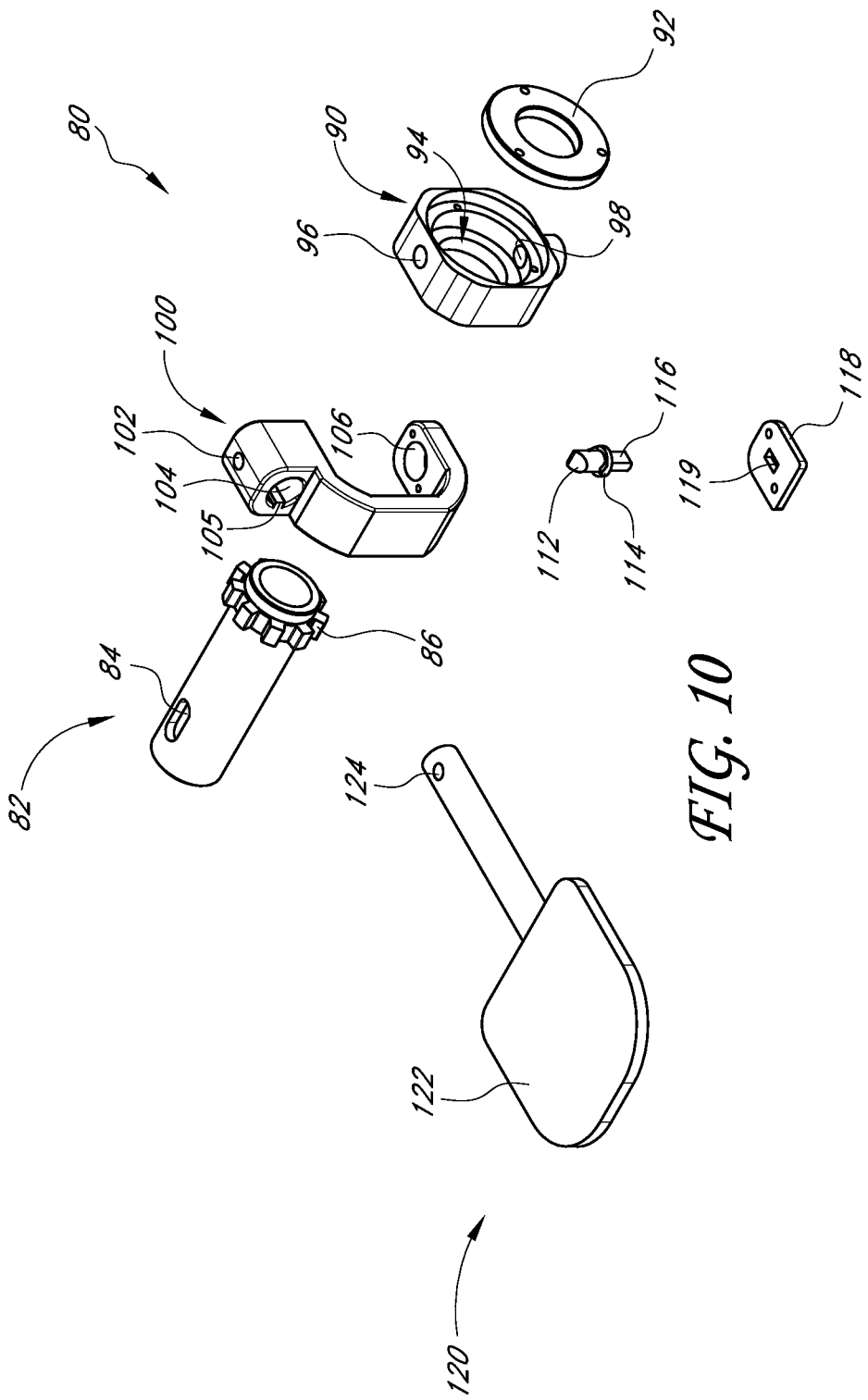
FIG. 10 is an exploded view of an embodiment of the actuation assembly illustrated in FIG. 4.

As depicted in FIGS. 5A, 5B, and discussed above, the control assembly 40 includes a wheel receiving body 60 that receives the middle wheel assemblies 20b. Further, as depicted, the wheel receiving body 60 can receive couplers 30 indirectly connected to the end wheel assemblies 20*a*. The couplers 30 can connect to a second rotational connection 64 of the wheel receiving body 60. The second rotational connection 64 is best depicted in FIGS. 6C, 6D. The wheel receiving body 60 can also have a first rotational connection 62, as best depicted in FIG. 9. As depicted, the wheel receiving body 60 can be symmetrical, with two of each receiving connection 62, 64 (one on each side). Further, the rotational connections 62, 64 can be aligned with their symmetrical companion to define first and second axes of rotation 62*a*, 64*a*, depicted in FIGS. 6A-6D. The first and second axes of rotation can be substantially parallel, and further can be non-collinear. Thus, depending on one's reference frame, the wheel receiving body 60 can be said to rotate about the first axis of rotation 62*a* and/or the second axis of rotation 64*a*. For convenience, the wheel receiving body 60 will herein be described as rotating about the first axis of rotation 62a.

In the depicted embodiment, the wheel receiving body 60 can be a substantially solid and rigid body, such that the entire body rotates together. Further, the center wheel assemblies 20*b* can be rigidly attached to the wheel receiving body 60, such that they can rotate with it as well. Even further, the wheel receiving body 60 can be substantially planar, with a broad portion 66 substantially defining the first rotational connections 62, and two substantially rigid projections 67 extending away from the broad portion and defining the second rotational connections 64 outside a primary plane of the broad portion and the wheel receiving body 60.

As previously noted, the wheel receiving body 60 can articulate or rotate about the first axis of rotation 62*a*, aligned with the first rotational connection 62. The wheel receiving body 60 can rotatably connect to a control body 50 at the first rotational connection 62. The control body 50 can also include a broad portion 51 and can further include two projections 52 extending away from the broad portion. The projections 52 can include rotational receiving portions 58 that rotatably meet the first rotational connections 62 of the wheel receiving body 60, e.g. with a pin joint.

In the depicted embodiment, the control body 50, and more particularly its broad portion 51, can have a "T" shape. The projections 52 can be located on the opposite ends of the "T" shape. At the base of the "T" shape, the control body 50 can have another projection that forms a shaft receiving portion 54. The shaft receiving portion can generally receive a translation shaft 70, further described below. More particularly, the shaft receiving portion 54 can define a channel through which the translation shaft 70 can extend, including a terminal bore at the end of the base of the "T."

In some embodiments, the control body 50 can rigidly attach to the housing 19, and thus can act as an extension thereof. As it can also be removable from the housing 19, the control body 50, in combination with other components of the control assembly 40, can form a modular component that can easily be built into the housing 19 and can further be separable from the housing 19 and/or other elements of the umbrella assembly 1.

At the second rotational connections 64 of the wheel receiving body 60, the wheel receiving body can connect to two linkages 68 that also form part of the embodiment control assembly 40. As depicted best in FIGS. 6C, 6D, the linkages 68 can be substantially straight bars extending from the wheel receiving body 60 to either side of a translation body 45 that also forms part of the embodiment control assembly 40. The linkages can be substantially rigid, defining a set distance between the second rotational connections 64 of the wheel receiving body 60 and corresponding rotational connections 47 of the translation body 45. A moveable connection between the translation body 45 and the linkages 68 can be formed, e.g. with a pin.

The translation body 45 can be a generally cuboid piece with its rotational connections 47 on opposite sides. Substantially perpendicular to the rotational connections 47, the translation body 45 can also include a bore 46 extending entirely through the translation body 45. The bore 46 of the translation body 45 can be threaded to interact with a threaded portion 72 of a translation shaft 70, which can also form a part of the embodiment control assembly 40.

The translation shaft 70 can be generally cylindrical and elongated, with certain additional features. For example, the translation shaft 70 can include a threaded portion 72 that interacts with the threaded bore 46 of the translation body 45. As will be further discussed below, this threaded interaction can cause the translation body 45 to translate along the translation shaft 70 as the shaft rotates. Further, an end 74 of the translation shaft 70 can extend through the shaft receiving portion 54 of the control body 50. Further extension of the shaft 70 through the shaft receiving portion 54 can be hindered by a cap piece 48 that can attach to the shaft receiving portion 54 and cover the terminal bore thereof The threaded portion 72 of the translation shaft 70 can be situated between the end 74 and a stop projection 76. The stop projection 76 can be in the form of an annular ridge extending about the shaft 70. Substantially adjacent to the stop 76, the shaft 70 can extend through a bore 43 of a guide body 42, which can also form part of the control assembly 40. The guide body 42 can be substantially cuboid like the translation body 45, with the bore 43 extending through opposite faces of the guide body 42. Further, the guide body 42 can include a recess 44 on a face including the bore 43 and facing the translation body 45 and the stop 76, such that the stop 76 can be received within the recess 44. In some embodiments, the depth of the recess 44 can be varied to affect the range of motion of the shaft 70, as it can be limited by the recess 44 of the guide body 42 on one end, and the cap piece 48 at another end. The guide body 42 can be rigidly attached to the control body 50 in the depicted embodiment, thus defining a firm restraint on the motion of the shaft 70 in said reference frame.

As best depicted in FIGS. 6A-6D, by these mechanisms the rotation of the translation shaft 70 along its primary axis (in the longitudinal direction) can cause the rotation of the wheel assemblies 20 about a lateral axis. More particularly, a rotation of the translation shaft 70 can cause a corresponding longitudinal translation of the translation body 45. Notably, the translation body 45 cannot rotate with the shaft 70 in the depicted embodiment for at least two reasons. First, the lateral axis of rotation defined between the rotational connections 47 can be held in alignment with the linkages 68, which can be held in alignment with the wheel receiving body 60, which can be held in alignment with the control body 40. Thus, longitudinal rotation of the translation body 45 can be hindered by its connection with the linkages 68. Second, the longitudinal rotation of the translation body 45 can be hindered by its proximity to the control body 40. As depicted in FIGS. 6A, 6B, the translation body 45 can be substantially close to the control body 40, such that the control body 40 can block any substantial longitudinal rotation of the translation body. As the translation body 45 cannot rotate with the shaft 70, the interaction of the threaded portions can cause the translation body 45 to translate relative to the control body 40.

Translation of the translation body 45 relative to the control body 40 can cause it to move closer to the first rotational connection 62 of the wheel receiving body 60 (associated with the control body 40). In the depicted embodiment, this motion can cause the wheel receiving body 60 to rotate about the first axis of rotation 62a (laterally), with a rotational force supplied through the linkages 68. This can then cause a rotation of the wheel assemblies 20, as described above.

Numerous variations can be made on the embodiments of the control assembly 40 described thus far. For example, in some embodiments the linkages 68 can be bent or curved. In other embodiments, the guide body 42 can be removed. In further embodiments, the control body 50 and/or the wheel receiving body 60 can have different shapes.

An embodiment of a actuation assembly 80, forming part of the control assembly 40, that can cause the rotation of the translation shaft 70 is best depicted in FIGS. 6A, 6B, 7A, 7B, 8, and 9. First, as best shown in FIGS. 6A and 6B, the translation shaft 70 can include a slot 78 generally opposite the end 74 associated with the cap piece 48. The slot 78 can generally be extended and can receive a pin 79 that also passes through a slot 84 in an actuating shaft 82 of the actuation assembly 80. Thus, the pin 79 can rotationally lock the translation shaft 70 to the actuating shaft 82. In some embodiments, the slots 78, 84 can be extended, such that some translation between the shaft 70, 82 is allowed.

The actuating shaft 82 can include a ratcheting portion or member depicted as a gear portion 86. The gear portion 86 can include a plurality of gear teeth. As depicted, the gear portion 86 can be positioned within a gear housing 90, and the rest of the actuating shaft 82 can extend therefrom.

The gear housing 90 of the actuation assembly 80, as depicted, can form a three-tiered cone-shaped opening. A first tier can be a wider portion, wider than the gear portion 86, and be further away from the translation shaft 70. The third tier can be a narrower portion and be smaller than the gear portion 86. The second tier can be between the first and third tiers and substantially match the outer extend of the gear portion 86 to allow the gear portion 86 to rotate longitudinally (about its primary axis) therein. Similarly, the third tier can substantially match the remainder of the actuating shaft 82, such that it can rotate longitudinally therein as well. The second tier can substantially define a gear space 94 that receives the gear portion 86. This gear space 94 can be enclosed by a gear cap 92 that can mount to the first tier of the gear housing 90.

Additionally, the gear housing 90 can include a ratchet bore 98. The ratchet bore 98, as depicted, can be at a lower portion of the gear housing 90. Further, the ratchet bore 98 can be aligned with a center of the gear space 94 and be generally vertical, or perpendicular to longitudinal primary axis of the actuating shaft 82 (although, as described below, this can be rotated from a vertical alignment to a lateral alignment). The ratchet bore 98 can be substantially circular, allowing rotation of a ratchet piece 110 therein. Further, the ratchet bore 98 can include notches 99 that can receive ridges 114 of the ratchet piece 110. As will be described further below, these elements can bias the ratchet piece 110 toward a given alignment within the ratchet bore 98.

As further depicted, the ratchet piece 110 can have an asymmetric tooth 112. The tooth 112 can form a ratcheting relationship with the gear portion 86, allowing rotation in a first rotational direction and hindering rotation in a second rotational direction opposite the first rotational direction. The ratcheting relationship can be at least partially formed by two opposing faces of the tooth 112, one being a rotation hindering face and the other being a rotation allowing face. The ratchet bore 98 can provide sufficient space for the ratcheting piece 110 to move within the bore and in and out of contact with the gear portion 86. The ratchet piece 110 can be biased toward contact with the gear portion 86 by a spring or another biasing device. The biasing device can push off from a receiving plate 118, which can mount to a bottom of a rotating body 100 that mounts about a bottom of the gear housing 90.

The rotating body 100, as depicted, can have a "C" shape. The "C" shape can extend around a side of the gear housing 90, mounting about a lower portion defining the ratchet bore 98, and about an upper portion defining a locking bore 96 generally similar to and opposite from the ratchet bore. The locking bore 96 can provide for a rotational connection between the rotating body 100 and the gear housing 90 about a vertical axis, i.e., an axis perpendicular to the primary (longitudinal) axis of the gear portion 86. The receiving plate 118, mounted to a bottom of the rotating body 100, can thus also rotate about the gear housing 90 on this axis.

The receiving plate 118 can further include a slot 119 that can have a rectangular shape. The slot 119 can receive a root 116 of the ratchet piece 110 that can have a matching rectangular shape (although other pairs of shapes are possible). Thus, the interaction between the ratchet piece 110 and the slot 119 can prevent rotation between them, as well as with the rotating body 100. The ratchet piece 110, receiving plate 118, and the rotating body 100 can all rotate together vertically about the gear housing 90.

Opposite the receiving plate 118, the rotating body 100 can also include a lever bore 104. The lever bore 104 can intersect the locking bore 102, being perpendicular to said locking bore, as well as perpendicular to the primary axis of the gear portion 86. Further, the lever bore 104 can include a protrusion 105.

As depicted, the lever bore 104 can receive a lever 120. The lever 120 can include an elongated slot 119 that can receive the protrusion 105, preventing rotation between the lever 120 and the rotating body 100. In some embodiments, the lever 120 can additionally include a bore 124 corresponding to the locking bore 102 on the rotating body 100 and the locking bore 96 on the gear housing 90. Thus, a pin passing through these bores can prevent translation of the lever 120 relative to the rotation body 100, and also support rotation between said elements and the gear housing 90.

In the depicted embodiment, the lever 120 can additionally include a pad portion 122 with a broadened surface area, at which an actuating pressure or force can be applied. In some embodiments, this pad 122 can be at a substantially low position such that the lever 120 can serve as a foot pedal.

Thus, when a user applies a downward pressure on the lever 120, this can cause the rotating body 100 to rotate about the primary axis of the gear portion 86. This rotation can be transmitted to the gear housing 90 via the ratchet piece 110, as well as an optional pin passing through the locking bores 96, 102, 124. Further, as best depicted in FIGS. 7A-7D, this rotation can also be transmitted to the gear portion 86 and the actuating shaft 82 via the ratchet piece 110, if in a first rotationally locked direction. If pressure is applied to the lever in the opposite direction, the ratchet piece 110 can translate deeper into the ratchet bore 98 and away from the gear portion 86, thus allowing relative rotation. Thus, a ratcheting relationship can be formed between the lever 120 and the actuating shaft 82.

Advantageously, the direction of this ratcheting relationship can be reversed in the depicted embodiment. For example, a pin passing through the locking bores 96, 102, 124 can support vertical rotation of the rotating body 100 about the gear housing 90 about an axis perpendicular to the longitudinal axis of rotation previously discussed, about the gear portion 86. Additionally, the ratchet piece 110 can also permit this vertical rotation. Even further, a lateral rotation similar to the vertical rotation and achieving similar results can be achieved if these components (optionally including the gear housing 90) are first rotated 90 degrees longitudinally, prior to the rotation of the rotating body 100.

As discussed above, the ratchet piece 110 can additionally include ridges 114 that can interact with notches 99 within the ratchet bore 98 of the gear housing 90. In some embodiments these ridges 114 and notches 99 can be in pairs, offset from each other by 180 degrees. Thus, they can bias the ratchet piece 110 (and also the rotating body 100 and associated elements) into two opposing orientations, depicted in FIGS. 7A-7D. Notably, in these opposing orientations, the direction of the ratcheting relationship is reversed.

Thus, in the depicted embodiment, the actuation assembly 80 can have a ratcheting relationship that can operate in two directions. Accordingly, the actuating assembly 80, with the rest of the control assembly 40 and the rest of the umbrella system 1 can raise and lower an umbrella system 1 (or another load) onto and off of one or more wheels 22. Both raising and lowering can be done with the assistance of the lever 120, providing a mechanical advantage. The ratcheting elements can facilitate multiple actuations of the lever 120, such that any force magnified by a mechanical advantage can easily be applied a plurality of times without reversing the direction of movement of a control element such as the translation shaft 70. If such a reversing were allowed, the results of the previous actuation could be undone in some embodiments.

Although described as supporting a load, in some embodiments the control assembly 40 can be used in other contexts. For example, in some embodiments the control assembly 40 can control a reversible jack, a braking system, a locking mechanism or the like. In such embodiments, the control assembly 40, including elements such as the gear 50 and the ratcheting members 60, 62 can be separated from the housing 19 and other elements of the umbrella assembly 1. The control assembly 40 can then be integrated into an alternative assembly with which it will be used.

The umbrella system 1 can be formed from a variety of materials. For example, in some embodiments a majority of the base assembly 10 can be metal, such as the side housing frame 18. However, the wheels 22 and pins 42 can be formed from other materials, such as a hardened plastic. The use of other materials is also contemplated as part of any of the embodiments described above.

Although the foregoing description of the preferred embodiment of the present invention has shown, described, and pointed out the fundamental and novel features of the invention, it will be understood that various omissions, substitutions, and changes in the form of the detail of the apparatus as illustrated, as well as the uses thereof, may be made by those skilled in the art without departing from the spirit of the present invention.

What is claimed is:

1. A ratchet assembly comprising:
   a housing;
   an articulating element rotatably coupled to the housing at a first axis of rotation;
   an elongated shaft comprising a threaded portion in operative contact with the housing and the articulating element such that rotation of the elongated shaft causes rotation of the articulating element with respect to the housing, the elongated shaft further comprising a first ratchet portion; and
   a rotation body mounted on the elongated shaft and comprising a second ratchet portion in operative contact with the first ratchet portion to allow relative rotation in a first direction about a primary axis of the elongated shaft and to prevent relative rotation in a second direction opposite the first direction; and
   a pedal mounted to the rotation body such that pressing downward on the pedal causes a rotation of the rotation body in the second direction, and a corresponding rotation of the elongated shaft;
   wherein the rotation body is rotatable about a second axis of the elongated shaft such that upon rotation of the rotation body about the second axis the ratchet portions allow relative rotation in the second direction about the primary axis and prevent relative rotation in the first direction, such that pressing downward on the pedal causes a rotation of the rotation body in the first direction, and a corresponding rotation of the elongated shaft.

2. The ratchet assembly of claim 1, wherein the first ratchet portion is a gear.

3. The ratchet assembly of claim 1, wherein the second ratchet portion is a ratcheting tooth.

4. The ratchet assembly of claim 1, wherein the elongated shaft extends through a translation body such that the translation body translates as the elongated shaft rotates.

5. The ratchet assembly of claim 4, wherein the translation body is linked to the articulating element such that translation of the translation body causes the articulating element to rotate with respect to the housing.

6. A ratchet assembly comprising:
   a housing;
   an elongated shaft comprising a threaded portion disposed within the housing and in operative contact with the housing, the elongated shaft further comprising a first ratchet portion;
   a rotation body mounted on the elongated shaft and comprising a second ratchet portion in operative contact with the first ratchet portion to hinder relative rotation about a primary axis of the elongated shaft; and
   a pedal mounted to the rotation body such that pressing downward on the pedal causes a rotation of the rotation body in a first direction about the primary axis of the elongated shaft, and a corresponding rotation of the elongated shaft;
   wherein the rotation body is rotatable about a second axis not collinear with the first axis such that upon rotation about the second axis pressing downward on the pedal causes a rotation of the rotation body in a second direction about the primary axis of the elongated shaft opposite the first direction, and a corresponding rotation of the elongated shaft.

7. The base assembly of claim 6, wherein the elongated shaft extends through a translation body such that the translation body translates as the elongated shaft rotates.

8. The base assembly of claim 6, wherein the first and second ratchet portions hinder relative rotation about a primary axis of the elongated shaft in a first direction, but allow relative rotation in a second direction opposite the first direction.

9. The base assembly of claim 6, wherein the rotation body is "C" shaped.

10. The base assembly of claim 6, wherein the first ratchet portion is a gear.

11. The base assembly of claim 6, wherein the first ratchet portion is a ratcheting tooth.

12. A ratchet assembly comprising;
    an elongated shaft comprising a gear;
    a gear housing rotatably supporting the elongated shaft to allow rotation about a primary axis of the shaft;
    a ratcheting member mounted in the housing and biased toward the gear to engage with the gear hindering relative rotation about the shaft axis in a first direction and allowing rotation about the shaft axis in a second direction opposite the first direction, the ratcheting member being rotatably mounted within the housing about a second axis; and an arm coupled to the gear housing in a first configuration to provide torque to rotate the housing about the shaft axis in the first direction when the arm is pressed downward, and the arm being coupled to the gear housing in a second configuration to rotate the housing about the shaft axis in a second direction opposite the first direction when the arm is pressed downward.

13. The ratchet assembly of claim 12, wherein the arm is rotatable relative to the gear housing about a second axis non-parallel with the first axis.

14. The ratchet assembly of claim 13, wherein after rotation of the arm about the second axis, the ratcheting member engages with the gear to hinder relative motion about the shaft axis in the second direction and to allow rotation about the shaft axis in the first direction.

15. The ratchet assembly of claim 12, wherein the ratcheting member comprises a rotation hindering face and a rotation allowing face opposite the rotation hindering face.

16. The ratchet assembly of claim 13, wherein rotation of the arm about the second axis causes a corresponding rotation of the ratcheting member.

17. The ratchet assembly of claim 16, wherein the ratcheting member is biased into one of two positions, corresponding to rotations of 180 degrees about the second axis.

18. The ratchet assembly of claim 12, further comprising a rotation body rotatably mounted to the gear housing, to which the arm is rotationally fixed.

19. The ratchet assembly of claim 12, further comprising a rotation body rotatably mounted to the gear housing, to which the ratcheting member is rotationally fixed.

* * * * *

UNITED STATES PATENT AND TRADEMARK OFFICE
CERTIFICATE OF CORRECTION

PATENT NO. : 8,919,722 B2  Page 1 of 1
APPLICATION NO. : 14/104951
DATED : December 30, 2014
INVENTOR(S) : Oliver Joen-an Ma It is certified that error appears in the above-identified patent and that said Letters Patent is hereby corrected as shown below:

In the Specification

In column 1 at line 13 (approx.), change "Application" to --Application Ser.--.

In column 3 at line 23, change "position." to --position;--.

In column 6 at line 36, change "angle 0" to --angle $\theta$--.

In column 8 at line 23, change "thereof" to --thereof.--.

In the Claims

In column 12 at line 46, On Claim 7 change "The base assembly" to --The ratchet assembly--.

In column 12 at line 49, On Claim 8 change "The base assembly" to --The ratchet assembly--.

In column 12 at line 54, On Claim 9 change "The base assembly" to --The ratchet assembly--.

In column 12 at line 56, On Claim 10 change "The base assembly" to --The ratchet assembly--.

In column 12 at line 58, On Claim 11 change "The base assembly" to --The ratchet assembly--.

Signed and Sealed this
Twenty-second Day of September, 2015

Michelle K. Lee
*Director of the United States Patent and Trademark Office*